Aug. 21, 1934.          E. FRIEDLANDER ET AL          1,971,103
                      SYMMETRICAL COMPONENT SYSTEM
                          Filed July 30, 1931

WITNESSES:
Leon J. Taza
M Davidson

INVENTORS.
Erich Friedlander and
Oskar Schmutz.
BY
O. H. Eschholz
ATTORNEY

Patented Aug. 21, 1934

1,971,103

UNITED STATES PATENT OFFICE

1,971,103

SYMMETRICAL COMPONENT SYSTEM

Erich Friedlander, Berlin-Spandau, and Oskar Schmutz, Berlin-Siemensstadt, Germany, assignors to Westinghouse Electric and Manufacturing Company, a corporation of Pennsylvania Application July 30, 1931, Serial No. 554,140 In Germany August 1, 1930

18 Claims. (Cl. 172—245)

The present invention relates to a method of, and means for, segregating the symmetrical components of an electrical quantity, or quantities, occurring in an unbalanced polyphase system.

The application of the present invention will be limited to three-phase systems, inasmuch as most of the power systems and distribution networks are three-phase. These three-phase systems are either grounded or ungrounded and any proper phase-sequence segregating networks associated with such three-phase systems must conform to the particular type of system.

In any polyphase system, and independently of whether such system is grounded or ungrounded, only the positive phase-sequence components of voltage and current are present during balanced or symmetrical conditions. However, during unbalanced or unsymmetrical system conditions, the negative phase-sequence components of voltage and current are also present in the system, the magnitude of such negative phase-sequence components depending upon the degree of system unbalance. In any ungrounded three-phase system, no zero phase-sequence components of voltage and current ever exist, while in a grounded neutral or four-wire polyphase system, the zero phase-sequence components of voltage and current exist during any fault conditions from one or a plurality of phases to ground, or whenever unbalanced loads are connected between the phase conductors and ground.

Bearing in mind the conditions under which the respective phase-sequence components of voltage and current occur, suitable phase-sequence segregating networks have been developed and used extensively in the metering and relaying of polyphase systems. In a three-phase ungrounded system, the voltage or current of only two phases is required in order to effect a proper indication of either the positive or the negative phase-sequence components of either electrical quantity occurring in the system, and proper line-voltage or line-current transformers are required only when the power or voltage of the system prohibits the direct coupling of the phase-sequence segregating network to the system. However, in the event that the phase-sequence components of voltage or current on a three-phase grounded system are to be segregated, it is necessary to employ the voltages or currents of all three of the phases.

It is well known that any polyphase system may be resolved into two symmetrical systems, one of positive or counter-clockwise rotation and the other of negative or clockwise rotation. In a three-phase ungrounded system, each of these symmetrical systems comprises three equal vectors, which are 120 degrees phase displaced and the magnitude of which depends upon the particular system characteristics and the degree of unbalance. In a three-phase grounded system, these same components also exits and, in addition, three equal in-phase vectors are in existence under fault or unbalanced conditions existing between one or more of the phases and ground.

By a proper analysis of these symmetrical component systems, it has been determined that a phase-sequence segregating network comprising impedances energized from different phase conductors of a three-phase ungrounded system may be provided. In one type of network the current flowing through one of such impedances is made to be in phase with the voltage of its associated phase conductor, and the second impedance associated with the other phase conductor of such system is arranged so that the current flowing therethrough is sixty degrees displaced with respect to the voltage of its associated phase conductor. The use of such a network permits the derivation of either the positive or the negative phase sequence components of an electrical quantity, depending upon the connection of the impedances together with a proper metering or relaying means.

Where it is necessary to provide line-voltage or line-current transformers in conjunction with a suitable phase-sequence segregating network, a metallic or electrical connection has been effected between the transformers and between the transformers and the network, with the result that it is impossible to use the same transformers for other combinations requiring different metallic connections between the transformers for supplying voltage or current for any other uses. This limitation may be highly objectionable in many applications and one purpose of the present invention is to obviate such limitation and effect a more flexible arrangement of the voltage or current transformers.

A second object of the present invention is to provide a suitable phase-sequence segregating network for deriving the positive and/or negative phase-sequence components of an electrical quantity occurring in a polyphase system and for effecting an inductive instead of metallic connection between the network and one or more of the required voltage or current transforming means associated with the polyphase system.

Another object of the present invention is to proportion the load in any desired manner between any required transforming means associated with a phase-sequence segregating network.

A further object of the present invention is to simplify the impedance branches of the phase-sequence segregating networks, when employing inductive coupling between the transforming means and the network.

Further objects and advantages of the present invention will become apparent from the following description of the modifications illustrated in the drawing.

Figure 1:
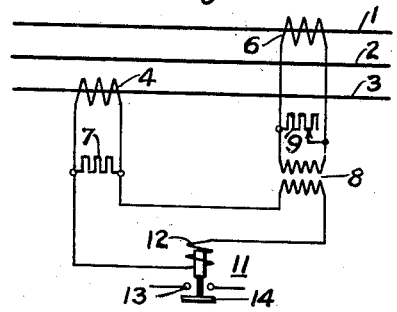
Figure 1 illustrates a very simple embodiment of the present invention wherein current transformers are only inductively interconnected through a phase-sequence segregating network.

Referring more particularly to Fig. 1, it is desired to segregate the positive phase-sequence components of current from a three-phase ungrounded system having phases 1, 2 and 3. Assuming that the magnitude of current in the respective phases requires the use of line-current transformers, one suitable current transformer having a secondary winding 4 is associated with phase 3 of the three-phase system and a second current transformer having a secondary winding 6 is associated with phase 1 of the three-phase system. A non-inductive resistance 7 is connected across the secondary winding 4 and a coupling transforming means 8 is connected across the current transformer secondary winding 6. A suitable impedance 9 is also connected across the current transformer secondary 6 and may be made variable, if desired.

It may be noted that the current transformer secondary 6 is inductively connected with the current transformer secondary 4 by means of the transformer 8, and, therefore, there is no metallic electrical connection between the two current transformer secondary windings. Since one object of the present invention is to obviate restrictions on such metallic or galvanic connection between the transformer secondary windings, and, further, since it is necessary to provide a suitable phase-sequence segregating network having two impedance branches wherein the current flowing through one of such impedance branches is in phase with the impressed voltage while the current flowing in the second impedance branch is required to be 60° phase-displaced with respect to its impressed voltage, the transforming means 8 may be utilized since only an inductive coupling of the transformers results and the transforming means 8 may also act as the second impedance in view of the inductive reactance provided by such arrangement.

The secondary winding of the transformer 8 is, therefore, so proportioned that a current flows therethrough which lags the exciting voltage by an angle of 60°, and such phase angle may be obtained by inserting any suitable impedance either in the primary or secondary circuits of the transformer 8, such as the impedance 9 in the primary circuit.

Figure 7:
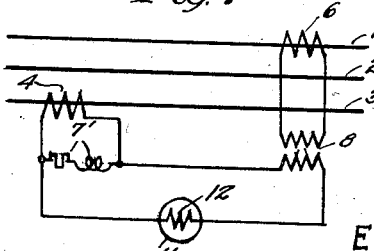
Fig. 7 is a view similar to Fig. 1, illustrating a modification.

As illustrated in this figure, the impedance 7 is an ohmic impedance and the entire phase angle displacement is effected by means of the transformer 8 and the impedance 9 associated with the current transformer secondary 6. However, the impedance 7 may be replaced by a combination of resistance and inductance, as indicated at 7' in Fig. 7, thereby eliminating the necessity for the impedance 9. Since the maximum phase displacement possible by means of the choke coil or transformer 8 is exactly 90° when there is no loss incident to such connection, the maximum permissible phase angle in the impedance 7' would be 30° in order to effect a resulting 60° phase relation between the impedance 7' and the choke coil or transformer 8. Since the coupling transformer 8 performs the function of an inductance or choke coil as a part of the phase-sequence network, it follows that it has relatively large exciting currents, as distinguished from ordinary transformers which are not choke coils and have exciting currents which are so small that they are usually negligible.

A suitable instrument such as relay 11 having an energizing winding 12, stationary contacts 13 and moving contact 14 may be associated with the phase-sequence segregating network comprising the impedances 7, 8 and 9. Obviously, this instrument may be any suitable meter or relay, as desired, and only the electrical connections for the energizing winding are deemed necessary for purposes of explanation.

Under normal or balanced system conditions in the three-phase system, and assuming that the network is a negative phase sequence segregating network, no current flows in the energizing winding 12 of the relay 11. The impedance of the winding 12 may be neglected for metering or relaying purposes and it follows, therefore, that the only current flowing in winding 12 must be proportional to the negative phase sequence components occurring in the associated three-phase system.

By effecting an acyclic or reversed phase-sequence change of transformer secondary windings 4 or 6 as, for instance, by connecting the current transformer 6 in phase 2 rather than phase 1, the network comprising the impedances 7, 8 and 9 may be converted into a positive phase sequence segregating network and the energizing winding 12 of the relay 11 would be energized only in accordance with the positive phase sequence components of current occurring in the associated three-phase system.

With reference to this Fig. 1 modification of the present invention, it may be noted that a novel form of phase sequence segregating network is provided, and since there is only an inductive coupling between the two current transformer windings 4 and 6, there is no objectionable limitation upon the application of such transformers for other and concurrent uses. It is also apparent that a further novel feature of the phase-sequence segregating network is that the inductive coupling comprising the transformer 8 is adapted to constitute one of the impedance branches of the phase sequence segregating network. The inductive coupling or reactive mutual impedance between the primary and secondary windings of an ordinary transformer is usually so high as to cause the transformer to draw relatively small exciting currents, but our coupling transformers are made so that this mutual impedance, instead of being very large, or almost infinitely high, is small enough to be utilized as one of the impedance branches of the phase-sequence network, that is, comparable to the other branches of the network.

Figure 2:
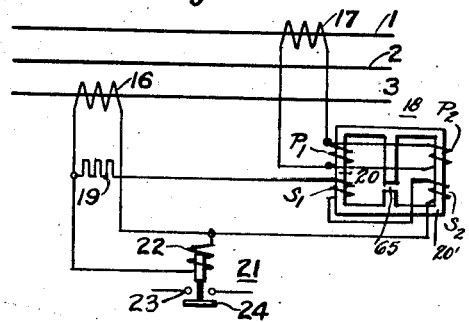
Fig. 2 illustrates a modification of Fig. 1 wherein the load on one of the current transformers is made substantially zero during symmetrical or balanced conditions on an associated polyphase system.

In Fig. 2, line-current transformers having secondary windings 16 and 17, respectively, are associated with two phases of a three-phase ungrounded system having phases 1, 2 and 3. The current transformer having the secondary winding 16 is associated with the phase 3 and the current transformer having the secondary winding 17 is associated with phase 1 of the three-phase system. A transformer 18 having a 2:1 ratio has the primary winding thereof connected across the current transformer secondary winding 17 and the primary and secondary windings of the transformer 18 are very closely coupled in order to minimize leakage inductance in the transformer. Since the transformer 18 has a ratio of 2:1, one means of effecting a low loss is to divide both the primary and secondary windings into two windings, $P_1$, $P_2$ and $S_1$ and $S_2$, respectively, and to wind the two primary windings $P_1$, $P_2$ in bifilar relation with the respective secondary windings $S_1$, $S_2$ on two branches 20 and 20' of a three-branch magnetic circuit, the primary windings $P_1$, $P_2$ being connected in parallel and the secondary windings $S_1$, $S_2$ being connected in series.

One secondary terminal of the transformer 18 is connected to one terminal of the current transformer secondary winding 16 through an impedance 19, the value of such impedance being equal to $$\sqrt{3} \cdot x,$$

where $x$ is the reactive mutual impedance of the transformer 18. The remaining terminal of the current transformer secondary winding 16 is connected to the other secondary terminal of the above transformer 18 and the choice of the above given value for the impedance 19 results in there being no normal loading on the current transformer secondary winding 16. This arrangement effects only a normal loading on the current transformer secondary winding 17, such normal loading being equal to the normal loading on either of the current secondary windings 4 or 6, as disclosed in the Fig. 1 modification, and, therefore, the arrangement of the 2:1 ratio transformer 18 and the impedance 19 results in a material saving in total load upon the current transformers associated with the three-phase system, and decreases the energy required by a positive or negative phase sequence segregating network.

A relay 21 having an energizing winding 22, stationary contacts 23 and moving contact 24, has one terminal of the energizing winding 22 thereof connected to the connection point of the transformer secondary 16 and the transformer secondary 18 while the other terminal is connected to the connection point of the remaining terminal of the secondary winding 16 and the impedance 19.

The current transformers having the respective secondary windings 16 and 17 may be so associated with the phases of the three-phase system, or the secondary leads of such transformers so interchanged, as to effect either a positive or negative phase-sequence segregating network and, therefore, the relay 21 will have the energizing winding 22 thereof energized either in accordance with the positive or the negative phase-sequence components of current occurring in the three-phase system, as desired.

The saving in power obtained by the Fig. 2 arrangement applies to only one of the two transformers, since the current transformer having secondary winding 17 is normally loaded, while the current transformer having secondary winding 16 is substantially unloaded. In many applications, however, a somewhat greater total load on the line-current transformers will not be objectionable, if the line-current transformers are uniformly loaded. A scheme whereby the line-current transformers may be loaded uniformly is disclosed in the Fig. 3 modification.

Figure 3:
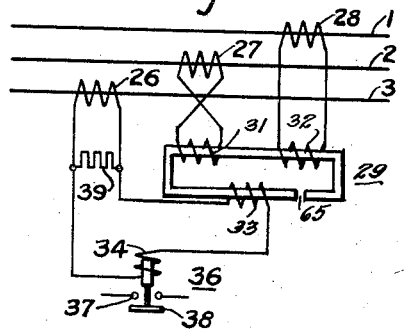
Fig. 3 illustrates a method of equalizing the load on the current transformers associated with a phase-sequence segregating network.

In Fig. 3, line-current transformers having secondary windings 26, 27 and 28, respectively, are associated with the phases 3, 2, 1, respectively, of a three-phase system. A choke coil or transformer arrangement 29, having an iron core and windings 31, 32 and 33, is associated with the respective secondaries of the three current transformers. The winding 31 is connected across the current transformer secondary winding 27 and the winding 29 is connected across the current transformer secondary winding 28. In order that the windings 31 and 32 have the same leakage with reference to the other winding 33, the two windings 31 and 32 are wound together as a bifilar winding, being wound close together on the same leg of the transformer core. The leads from the current transformer secondary winding 27 are crossed with respect to the winding 31.

The third winding 33, of the choke coil arrangement or transformer 29, is connected in series with the energizing winding 34 of a relay 36 having stationary contacts 37 and a moving contact 38. The series connected windings 33 and 34 are connected across the transformer secondary winding 26 and in parallel with an impedance 39.

In order for this circuit to effect a segregation of the rotational components of current occurring in the three-phase system, the following equation must be fulfilled:

$$Z + j \cdot X \cdot (n - n^2) = 0$$

where Z is the impedance of the impedance device 39, and X is the inductive impedance of the transformer arrangement 29 and where $$n = \varepsilon^{j120°}.$$

From this equation it follows that the impedance device 39 is a pure resistance with an impedance $$Z = \sqrt{3} \cdot X.$$

Under these conditions, all the transformers will be loaded equally and the load on each transformer will only be half as great as the load on the transformer having secondary winding 17, in Fig. 2. Clearly, this loading of all of the transformers provides a smaller total transformer loading than the simple arrangement disclosed in Fig. 1.

The ratio between the windings 31, 32 and 33 is preferably 1:1 in order to obtain an equal loading on all of the current transformers. However, other ratios may be utilized, depending upon any particular desired distribution of the load between the transformers.

In the foregoing modification of the present invention, the load on the transformers is necessarily large inasmuch as the phase angle between the two currents, into which the current is divided when the current enters the two impedances comprising the phase sequence segregating network, must be 60° phase displaced, and only ohmic and inductive impedances are utilized. A saving in power or a reduction of the total load required by the current transformers may be obtained by the use of a bridge network which is disclosed in the patent to Sleeper et al. No. 1,726,923, issued September 3, 1929, requiring the use of two impedance branches in conjunction with a positive and a negative phase sequence instrument.

Figure 4:
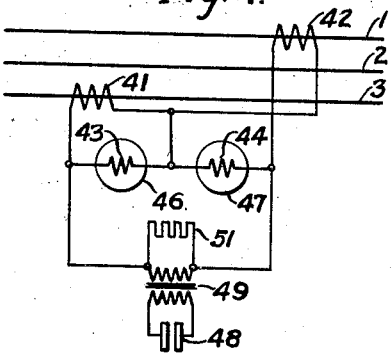
Figs. 4 and 5 illustrate an improved modification of a known type of bridge network.

In Fig. 4, we show a simplified modification of such a bridge network in which one of the bridge impedances is zero, thus constituting a positive electrical connection between the transformers, the opposite bridge impedance being replaced by a capacitive impedance. It is desirable to segregate the positive and negative sequence components of current from a three-phase system comprising phase conductors 1, 2 and 3. For this purpose, a current transformer having secondary winding 41 is associated with the phase conductor 3 and a current transformer having a secondary winding 42 is associated with the phase conductor 1. Since our modified bridge circuit requires only one impedance branch, the omission of the other impedance branch results in the connection of the one terminal of the secondary winding 41 to the corresponding secondary winding 42. The energizing windings 43 and 44 of any suitable meters or relays 46 and 47, respectively, have one terminal of each connected to the series connection between the current transformer secondaries 41 and 42. The remaining terminal of the energizing winding 43 is connected to the remaining secondary terminal of the winding 41, while the remaining terminal of the winding 44 is connected to the other terminal of the winding 42.

A capacitance device 48 is adapted to be connected in parallel with the series connected energizing windings 43 and 44. The capacitance device 48 is placed in the primary circuit of a suitable transformer 49 and an impedance device 51 is connected in parallel with the secondary winding of the transformer 49 and the series connected windings 43 and 44 for the purpose of effecting a proper phase angle relation between the energizing windings 43, 44 and the impedance branch comprising the condenser 48, transformer 49 and the impedance 51. The transformer 49 is not absolutely necessary and is only provided in order to permit the use of a smaller sized capacitance device 48, and it is clearly apparent that a suitable capacitance device 48 may be connected directly in parallel circuit relation with the energizing windings 43 and 44.

In this modification, the windings 43 and 44 must be inductive so that the phase angle between each of the windings 43 and 44 and the impedance branch comprising the capacitance device 48, transformer 49 and impedance 51 will be 120°. By means of this circuit, it is possible to obtain both an instrument responsive to the positive phase sequence components of current occurring in the three-phase system and also an instrument responsive to the negative phase sequence components of current. Obviously, the instruments 46 and 47 may be made responsive to the positive and negative phase sequence components of current, respectively, by effecting a proper phase-sequence connection of the leads from the current transformer secondaries 41 and 42.

An important advantage which is obtained by the use of this circuit is that the two current transformers having the secondary windings 41 and 42, respectively, may be grounded, thereby facilitating different types of measurements which would otherwise be impossible to obtain because the transformers could not be grounded. The load on the two current transformers is also extraordinarily small, thereby presenting a very decided advantage over prior bridge networks.

Under normal system conditions, only the positive phase sequence components of current are in existence and, therefore, the positive phase-sequence instrument 46 is normally energized while the instrument 47 is normally deenergized.

In the event that only one rotational component of current is desired to be segregated from the three-phase system, the circuit arrangement disclosed in Fig. 4 may be utilized with the exception of replacing one of the instruments 46 or 47 by a suitable impedance.

Figure 5:
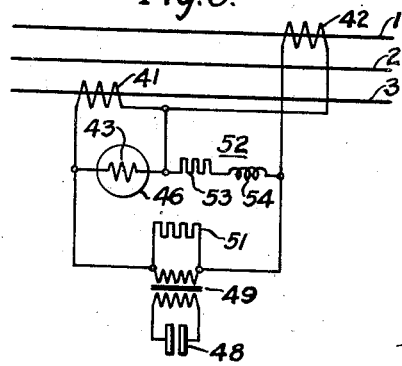

Fig. 5 discloses a circuit arranged for effecting the segregation of only one rotational component and is similar to the circuit arrangement illustrated in Fig. 4, with the exception that the instrument 47 is replaced by a suitable impedance 52 comprising a series-connected ohmic impedance 53 and inductive impedance 54. Obviously, the remaining instrument 46 may be made responsive to either the positive or to the negative phase-sequence components of the current occurring in the three-phase system.

All of the three-phase systems considered in connection with the networks disclosed in Figs. 1 to 5, inclusive, have been ungrounded systems and, therefore, only the currents from two of the phases had to be considered in order to effect a proper segregation of either the positive or the negative phase-sequence components of current. However, as mentioned hereinbefore, in effecting a segregation of either the positive or the negative phase-sequence components of an electrical quantity from a three-phase grounded system, it is necessary to utilize such electrical quantity of all three phases.

Figure 6:
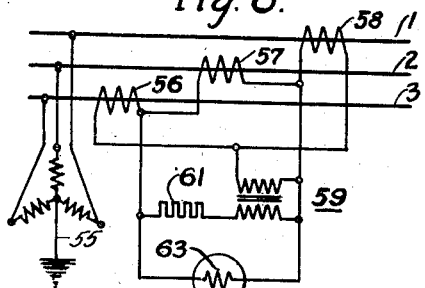
Fig. 6 illustrates the application of the present invention to a three-phase grounded system.

Fig. 6 illustrates a simple embodiment of the present invention, similar to the Fig. 2 modification, as applied to a three-phase grounded system.

Ordinarily, in three-phase grounded systems, it is necessary to eliminate the zero phase-sequence components from the positive or negative phase-sequence segregating network. This may be accomplished by delta connecting the secondaries of the transformers associated with the respective phases of the three-phase grounded system.

Fig. 6 illustrates a three-phase grounded system having phase conductors 1, 2 and 3, a ground or neutral as shown at 55, and current transformers having delta connected secondary windings 56, 57 and 58, respectively, are associated with the respective phase conductors 3, 2 and 1 of the three-phase system. A transformer 59 has the primary winding thereof connected across one branch of the delta connection of the current transformers and the secondary winding of the transformer 59 is connected in series with an impedance 61 and this series connection is connected across a second branch of the delta connected current transformers. An instrument 62 has the energizing winding 63 thereof connected in parallel with the series-connected impedance 61 and the secondary winding of the choke coil arrangement or transformer 59 and, depending upon the phase-sequence connections of the current transformer secondary windings, the instrument 62 may be made responsive either to the positive or to the negative phase-sequence components of current, as desired.

In this arrangement, one of the transformers is unloaded when the three-phase system is balanced or symmetrically loaded while the remaining two transformers will each supply a current amounting to $$\frac{1}{\sqrt{3}}$$

of the amount of power required by one of the current transformers shown in Fig. 1 or the current transformer having a secondary winding 17, as disclosed in Fig. 2.

The coupling transformer means 8, 18, 29 and 59 illustrated in Figs. 1, 2, 3 and 6, respectively, are designed to have as low a leakage as possible and, in order to prevent saturation of the iron cores, the cores should, preferably, be provided with a suitable air gap as indicated at 65 in Figs. 2 and 3. As previously noted, also, our coupling transformers have relatively low mutual impedance, which means a relatively high exciting current. It follows, therefore, that the construction of the transformers would have to be special, but the decided savings in power consumption more than overbalances this apparently objectionable requirement.

The modifications disclosed in the various figures of the drawing are directed to a simplified phase-sequence segregating network which permits the use of the energizing transformers for other and concurrent applications by effecting only an inductive coupling between the respective transformers, and means are also provided for minimizing the amount of power or load required by the various energizing transformers under normal balanced system conditions.

The present invention is, therefore, directed to a method of, and means for, segregating the positive and/or negative phase-sequence components of an electrical quantity from a polyphase system by a network which is more simplified and economical than any phase-sequence segregating networks heretofore devised.

The present invention should, therefore, be limited only by the prior art and as indicated in the appended claims.

We claim as our invention:

1. In combination with a three-phase system, transforming means associated therewith for deriving currents proportional to a plurality of the phase currents of said system, electroresponsive means responsive to the positive phase-sequence components of current occurring in said system, a second electroresponsive means responsive to the negative phase-sequence components of current occurring in said system, a capacitative impedance element electrically associated with both of said electroresponsive means and said transforming means, said electroresponsive means being inductive so that the combination thereof and said capacitative impedance element effects the segregation of the positive and the negative phase-sequence components of current from said three-phase system.

2. A phase-sequence-responsive device, a phase-sequence network for supplying the same with energy from a three-phase line, and a plurality of supply-means for supplying said network with energy from a corresponding number of phases of an electrical quantity of the line, said network comprising a combination of impedances, including resistance and reactance, said reactance impedance including a coupling transformer which interconnects said supply-means through reactance.

3. A phase-sequence-responsive device, a phase-sequence network for supplying the same with energy from a three-phase line, and a plurality of supply-means for supplying said network with energy from a corresponding number of phases of an electrical quantity of the line, said network comprising a combination of impedances, including resistance and reactance, said reactance impedance including a coupling transformer which interconnects said supply means through reactance, said coupling transformer having a magnetizable core with an air gap therein.

4. A phase-sequence-responsive device, a phase-sequence network for supplying the same with energy from a three-phase line, and a plurality of supply-means for supplying said network with energy from a corresponding number of phases of the line current, said network comprising a combination of impedances, including resistance and reactance, said reactance impedance including a coupling transformer which interconnects said supply means through reactance.

5. A phase-sequence-responsive device, a phase-sequence network for supplying the same with energy from a three-phase line, and a plurality of supply-means for supplying said network with energy from a corresponding number of phases of the line current, said network comprising a combination of impedances, including resistance and reactance, said reactance impedance including a coupling transformer which interconnects said supply-means through reactance, said coupling transformer having a magnetizable core with an air gap therein.

6. A phase-sequence-responsive device, a phase-sequence network for supplying the same with energy from a three-phase line, and a plurality of sources for supplying said network with energy in accordance with a plurality of phases of an electrical quantity of the line, said network comprising a coupling transformer having a primary winding circuit energized from one of said sources and a secondary winding circuit connected to a second one of said sources through a resistance having approximately $$\sqrt{3}$$

times the reactive impedance of said coupling transformer, said phase-sequence-responsive device being energized from said second source and said secondary winding circuit and resistor whereby said phase-sequence-responsive device receives substantially no energy when balanced phase-sequence conditions exist in said electrical quantity of the line.

7. A phase-sequence-responsive device, a phase-sequence network for supplying the same with energy from a three-phase line, and a plurality of sources for supplying said network with energy in accordance with a plurality of phases of the line current, said network comprising a coupling transformer having a primary winding circuit energized from one of said sources and a secondary winding circuit connected across a second one of said sources through a resistance having approximately $$\sqrt{3}$$

times the reactive impedance of said coupling transformer, so that the voltage across said second source is substantially zero when balanced phase-sequence conditions exist in the line current, said phase-sequence-responsive device being connected across said second source.

8. A phase-sequence-responsive device, a phase-sequence network for supplying the same with energy from a three-phase line, and three sources for supplying said network with energy in accordance with the three phases of an electrical quantity of the line, said network comprising a coupling transformer having two primary winding circuits energized respectively from two of said sources, the connections to one of said two sources being reversed with respect to the connections to the other of said two sources, and a secondary winding circuit connected to the third one of said sources and associated with a resistance, said phase-sequence-responsive device being energized from said third source and said secondary winding circuit whereby said phase-sequence-responsive device receives substantially no energy when balanced phase-sequence conditions exist in said electrical quantity of the line.

9. A phase-sequence-responsive device, a phase-sequence network for supplying the same with energy from a three-phase line, and three sources for supplying said network with energy in accordance with the three phases of the line current, said network comprising a coupling transformer having two primary winding circuits energized respectively from two of said sources, the connections to one of said two sources being reversed with respect to the connections to the other of said two sources, and a secondary winding circuit connected to the third one of said sources through said phase-sequence-responsive device, and a resistor having a value of approximately $$\sqrt{3}$$

times the reactance of said coupling transformer connected across said third source.

10. In combination, a positive-phase-sequence-responsive device, a negative-phase-sequence-responsive device, said devices having matching impedances which are inductive, said devices being connected in series with each other in a series circuit, a plurality of sources for supplying said network with energy in accordance with a plurality of phases of an electrical quantity of a three-phase line, and a capacitive impedance branch having an impedance 120° displaced from the impedances of said devices and being so connected to said series circuit and to two of said sources that said positive-phase-sequence-responsive device receives substantially no energy when substantially balanced negative-phase-sequence conditions exist in said electrical quantity, and said negative-phase-sequence-responsive device receives substantially no energy when substantially balanced positive-phase-sequence conditions exist in said electrical quantity.

11. In combination, a positive-phase-sequence-responsive device, a negative-phase-sequence-responsive device, said devices having matching impedances which are inductive, said devices being connected in series with each other in a series circuit, a plurality of sources for supplying said network with energy in accordance with a plurality of phases of the current in a three-phase line, and a capacitive impedance branch having an impedance 120° displaced from the impedances of said devices, said capacitive impedance branch being connected across said series circuit, and two different ones of said sources being connected respectively across said two devices.

12. A phase-sequence-responsive device, a phase-sequence network for supplying the same with energy from a three-phase line, and a plurality of sources for supplying said network with energy in accordance with a plurality of phases of an electrical quantity of the line, said network comprising a capacitive impedance branch and an impedance branch matching the impedance of said phase-sequence-responsive device, the latter impedance being inductive, said device and said matching impedance branch being connected in series with each other in a series circuit, said capacitive impedance branch having an impedance 120° displaced from the impedances of said phase-sequence-responsive device and said matching impedance branch and being so connected to said series circuit and to two of said sources that said phase-sequence-responsive device receives substantially no energy when substantially balanced phase-sequence conditions exist in said electrical quantity.

13. A phase-sequence-responsive device, a phase-sequence network for supplying the same with energy from a three-phase line, and a plurality of sources for supplying said network with energy in accordance with a plurality of phases of the line current, said network comprising a capacitive impedance branch and an impedance branch matching the impedance of said phase-sequence-responsive device, the latter impedance being inductive, said device and said matching impedance branch being connected in series with each other in a series circuit, said capacitive impedance branch being connected across said series circuit, and two different ones of said sources being connected respectively across said phase-sequence-responsive device and said matching impedance branch.

14. The invention as defined in claim 4, characterized by said coupling transformer having a relatively large exciting current with respect to its load current.

15. The invention as defined in claim 7, characterized by said coupling transformer having a relatively large exciting current with respect to its load current.

16. The invention as defined in claim 9, characterized by said coupling transformer having a relatively large exciting current with respect to its load current.

17. The invention as defined in claim 11, characterized by said coupling transformer having a relatively large exciting current with respect to its load current.

18. The invention as defined in claim 13, characterized by said coupling transformer having a relatively large exciting current with respect to its load current.

ERICH FRIEDLANDER.
OSKAR SCHMUTZ.